United States Patent
Delmerico et al.

(10) Patent No.: US 7,298,059 B2
(45) Date of Patent: Nov. 20, 2007

(54) SYSTEM AND METHOD FOR OPERATING A WIND FARM UNDER HIGH WIND SPEED CONDITIONS

(75) Inventors: Robert William Delmerico, Clifton Park, NY (US); Mark Edward Cardinal, Altamont, NY (US); Kirk Gee Pierce, Simpsonville, SC (US)

(73) Assignee: General Electric Company, Niskayuna, NY (US)

( * ) Notice: Subject to any disclaimer, the term of this patent is extended or adjusted under 35 U.S.C. 154(b) by 496 days.

(21) Appl. No.: 11/016,078

(22) Filed: Dec. 17, 2004

(65) Prior Publication Data

US 2006/0132994 A1    Jun. 22, 2006

(51) Int. Cl.
    *H02J 1/00*    (2006.01)
(52) U.S. Cl. .................................................... 307/85
(58) Field of Classification Search ................. 307/85
    See application file for complete search history.

(56) References Cited

U.S. PATENT DOCUMENTS

| 4,700,081 A * | 10/1987 | Kos et al. ................. 290/44 |
| 2002/0029097 A1 | 3/2002 | Pionzio et al. |
| 2003/0155773 A1 | 8/2003 | Hobben ........................ 290/44 |

FOREIGN PATENT DOCUMENTS

| EP | 0847496 B1 | 8/2000 |
| WO | WO 01/73518 | 10/2001 |
| WO | WO 03/030329 | 4/2003 |
| WO | WO 2004/059814 | 7/2004 |

OTHER PUBLICATIONS

Jorgen Svensson and Per Karlsson, Wind Farm Control Software Structure, International Workshop on Transmission Networks for Offshore Wind Farms, Apr. 2002.
Peter Christiansen, Knud K. Jorgensen and Aksel Gruelund Sorensen, Grid Connection and Remote Control for the Horns Rev 150 MW Offshore Wind Farm in Denmark, International Workshop on Transmission Networks for Offshore Wind Farms, Mar. 2001, pp. 1-11.
C.C. Kontogiannis, E.C. Tsimplostefanakis and A.N. Safaccas, An Efficient Power Management and Control in Wind Parks by Means of a Radio Telemetry Control System, Electromotion, Mediamira, Jun. 19, 2001, pp. 461-465.
Terje Gjengedal, System Control of Large Scale Wind Power by Use of Automatic Generation Control (AGC), Quality and Security of Electric Power Delivery System and PES International Symposium, 2003, pp. 15-21.

* cited by examiner

*Primary Examiner*—Robert L. Deberadinis
(74) *Attorney, Agent, or Firm*—Fletcher Yoder

(57) ABSTRACT

A system and method of operating a wind farm, having multiple wind turbine generators, at high wind speeds is provided. Wind speeds at individual wind turbine generators are monitored and a signal is transmitted from the wind turbine generators to a wind farm control system based on the monitored wind speeds. Rate of change of collective power output of the wind farm is temporally monitored and is controlled by coordinating of operational states of the wind turbine generators based upon the signals transmitted by the one or more wind turbine generators, operating conditions of the wind turbine generators and the monitored rate of change of power output of the wind farm.

22 Claims, 5 Drawing Sheets

SYSTEM AND METHOD FOR OPERATING A WIND FARM UNDER HIGH WIND SPEED CONDITIONS

BACKGROUND

The invention relates generally to the field of wind power generation, and in particular to wind farms having multiple wind turbine generators. Specifically, embodiments of the present technique provide a method and system to control power ramp down rate of a wind farm during high wind speed conditions.

Wind turbines are regarded as environmentally friendly and relatively inexpensive alternative sources of energy that utilize wind energy to produce electrical power. A wind turbine generator generally includes a wind rotor having a plurality of blades that transform wind energy into rotational motion of a drive shaft, which in turn is utilized to drive a rotor of an electrical generator to produce electrical power. Modern wind power generation systems typically take the form of a wind farm having multiple such wind turbine generators that are operable to supply power to a transmission system providing power to a utility grid. Output from the wind turbine generators is typically combined for transmission to the grid.

Wind is an intermittent resource and power supplied by the wind farm to utilities is significantly influenced by changes in wind conditions. Generally, power output of a wind turbine power station increases with wind speed, until the wind speed reaches the rated wind speed for the turbine. With further increases in wind speed, the turbine operates at rated power up to a cut off value or a trip level. This is generally the wind speed at which dynamic loads on the wind turbine cause the mechanical components of the turbine to reach a fatigue limit. As a protective function, at wind speeds higher than a certain speed, wind turbines are often required to shut down, or reduce loads by regulating the pitch of the blades or braking the rotor, thereby leading to a reduced power output of the wind turbine generator, and consequently of the wind farm. However, electrical loads on utilities need to be balanced at all times by power generation units. Hence, utility systems usually have additional power generation resources available, such as thermal generators, that can accommodate this variability in wind conditions.

While the additional power resources can compensate for loss of power from wind farms, some amount of time is required to ramp up their output. For this reason, transmission system operators may require wind farms to control power ramp down rates during high wind speed conditions, particularly during high wind speed shutdown of the wind turbines. Such ramp down control is desirable in order to achieve compatibility between power ramp down rate of the wind farm and power ramp up rates of certain other generation resources supplying power to the utilities. This problem has not been coordinated at the wind farm level to control the aggregate shutdown and ramp down levels before wind turbines reach their high speed shutdown protective limits.

Accordingly, there exits a need for a technique to control operation of a wind farm so as to maintain power ramp down rate of the wind farm within desirable power ramp down rates during high wind speed conditions.

BRIEF DESCRIPTION

The present technique accordingly provides a novel approach toward controlling wind farm ramp rate at high wind speed conditions via a supervisory or a central control system. In one aspect, a method for operating a wind farm having a plurality of wind turbine generators is provided. The method includes monitoring wind speeds at individual wind turbine generators and transmitting a signal from the wind turbine generators to a wind farm control system based on the measured or inferred wind speeds. The method further includes monitoring rate of change of collective power output of the wind farm and controlling the rate of change of power output by coordination of operational states of the wind turbine generators based upon the signals transmitted by the one or more wind turbine generators, operating conditions of the wind turbine generators and the monitored rate of change of power output of the wind farm.

In another aspect, a wind farm control system is provided. The wind farm control system includes a processing unit and an input/output interface. The input/output interface is configured to receive change of operational state requests from a plurality of wind turbine generators and to transmit authorization signals for curtailment of output to the wind turbine generators based upon the requests. The processing unit is configured to control rate of change of power output of the wind farm by sequencing curtailment of output based on the change of operational state requests received from the plurality of wind turbine generators to coordinate curtailment of output of the wind turbine generators based on operating conditions of the wind turbine generators and monitored rate of change of power output of the wind farm.

In yet another aspect, a wind farm is provided. The wind farm includes a plurality of wind turbine generators and a wind farm control system. The plurality of generators is operable to supply power to a utility system. The wind farm control system is configured to receive change of operational state requests from the wind turbine generators based on measured or inferred wind speed at the wind turbine generators. The wind farm control system is further configured to coordinate operational states of the wind turbine generators based upon the change of operational state requests, operating conditions of the wind turbine generators and a desired rate of change of power output of the wind farm.

In still further aspects, computer programs and routines are provided comprising code adapted to implement the above described methods.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present technique provides a system and method for controlling power ramp down rate of a wind farm having a plurality of wind turbine generators at high wind speeds via a central or supervisory wind farm control system. In certain embodiments, the wind farm control system is operable to control power ramp down rate of the wind farm by coordinating shutdown or state change of the wind turbine generators at high wind speeds such that the collective power ramp down rate does not exceed a desired ramp down rate required by transmission system operators. Embodiments of the present technique are described in detail below referring generally to FIGS. 1-5

Figure 1:
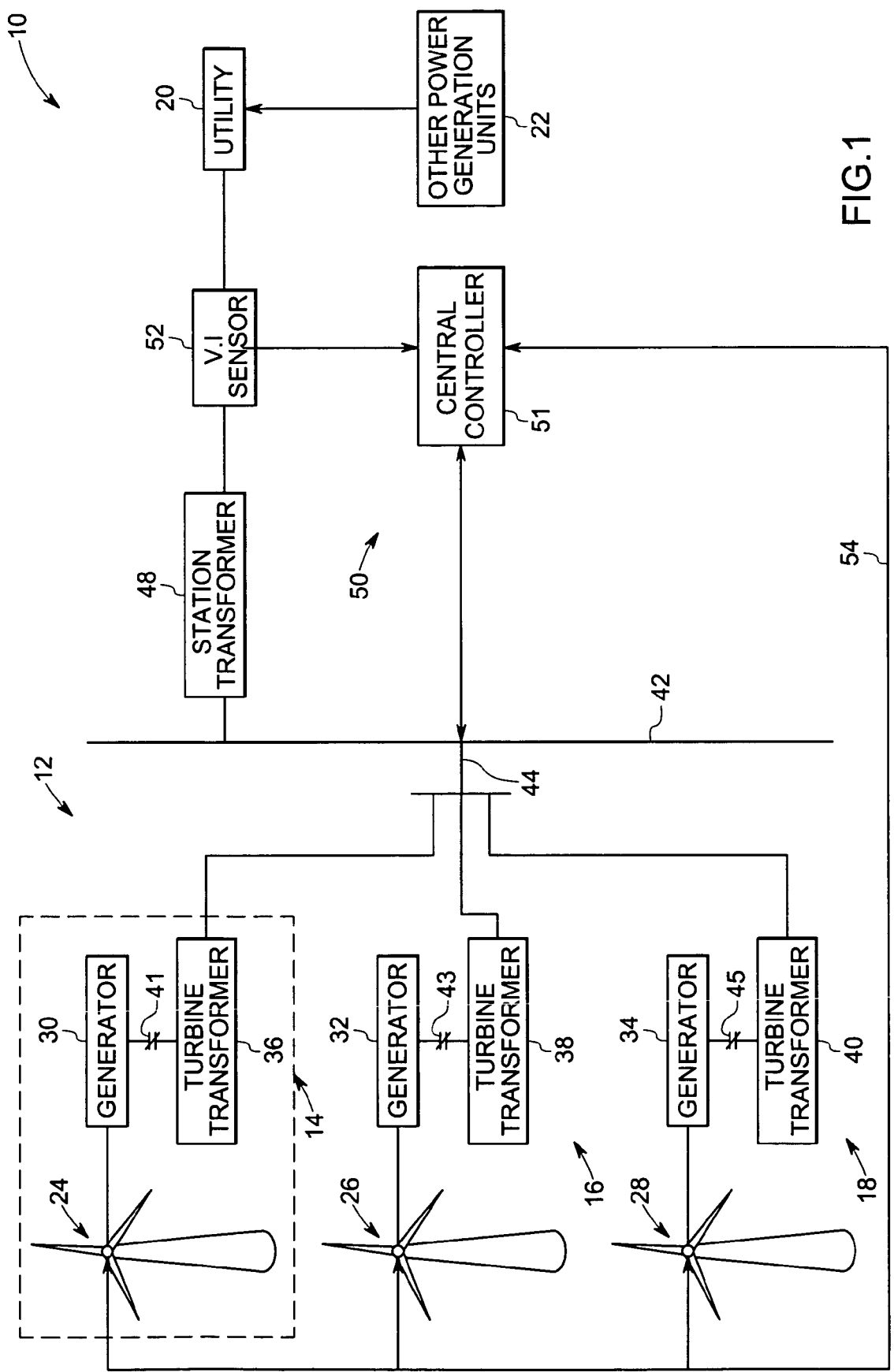
FIG. 1 is a schematic illustration of a wind power generation system according to aspects of the present technique.

FIG. 1 illustrates an exemplary wind power generation system 10 in accordance with aspects of the present technique. The wind power generation system 10 includes a wind farm 12 having a plurality of wind turbine generators 14, 16, 18 operable to supply electrical power to a utility 20. Additionally, the utility 20 may receive power from other power generation units 22 to accommodate variability in power output of the wind farm 12 due to intermittent wind conditions. Other power generation units 22 may include, for example, thermal, hydroelectric or nuclear power stations, among others.

Wind turbine generators 14, 16, 18 include turbine rotors 24, 26, 28 having plurality of blades which drive rotors of electrical generators 30, 32, 34 to produce electrical power. Power produced by generators 30, 32, 34 may be stepped up in voltage by turbine transformers 36, 38, 40 before being coupled to a medium voltage distribution network 42. In the illustrated embodiment, a feeder 44 is used to couple power outputs of wind turbine generators 14, 16, 18 for supply to the medium voltage distribution network 42. In a typical application, the medium voltage distribution network 42 couples power from multiple feeders (not shown), each feeder coupling power outputs of a plurality of wind turbine generators. In certain embodiments, power is coupled from the wind turbine generators 14, 16, 18 to the feeder 44 via switching devices 41, 43, 45, which may include, for example an electrical circuit breaker. Such switching devices are generally used in wind power generation systems to shut down power generation by one or more of the wind turbine generators during high wind conditions. A station transformer 48 is generally used to step-up voltage of the power from the medium voltage distribution network 42 to a transmission voltage required by the utility 22.

In accordance with the present technique, the wind farm 12 includes a wind farm control system 50 comprising a central controller 51. In the illustrated embodiment, the wind farm control system 50 is operable to monitor and control rate of change of collective power output of the wind farm 12. Rate of change of power output is also referred to in this discussion as power ramp rate. The wind farm control system 50 further comprises power sensors, such as voltage and current sensors 52, which are configured to sense collective power output of the wind farm 12 and may either be coupled to an output of the station transformer 48 (as illustrated in FIG. 1) or to a point in the medium voltage distribution network 42.

The central controller 51 is configured to communicate with individual wind turbine generators via communication links 54, which may be implemented in hardware and software. In certain embodiments, the communication links 54 may be configured to remotely communicate data signals to and from the central controller 51 in accordance with any wired or wireless communication protocol known to one skilled in the art. As discussed later, such data signals may comprise signals indicative of operating conditions of individual wind turbine generators transmitted to the central controller 51 and various command signals communicated by the central controller 51 to individual wind turbine generators. The central controller 51 may further be in communication with the medium voltage distribution network 42, and may be operable to control various switching devices in the network 42, such as capacitors and reactors (not shown) so as to control the power output of the wind farm 12 within specifications prescribed by transmission system operators.

As discussed earlier, wind turbine generators are generally designed to generate power at wind speeds lower than a predetermined threshold, also referred to as protective wind speed limit, also referred to as cutout wind speed. In the illustrated embodiment, each of the wind turbine generators has an autonomous protection function that requires the wind turbine generator to trip or shut down power generation when average wind speeds at the wind turbine generator exceed this protective wind speed limit. In one embodiment, such as in case of a wind turbine generator having variable-pitch blades, a shutdown operation may include pitching the blades toward stall (i.e. at 90 degrees to the wind direction) or feather (i.e. at 0 degrees to wind direction), resulting in minimal capture of wind energy by the blades. In a further embodiment, a shutdown operation may include mechanical braking of the turbine rotor. In a still further embodiment, shutdown may be accomplished via switching devices as illustrated in FIG. 1.

The present technique provides a control mechanism whereby, at high wind speeds (i.e. at wind speeds approaching the protective wind speed limit), wind turbine generators shut down, change state or curtail their power output in an orderly or sequenced manner, to maintain a desired rate of decrease of collective power output or power ramp down rate of the wind farm 12 under high wind speed conditions. In accordance with aspects of the present technique, individual wind turbine generators are configured to anticipate their protection function when average wind speeds at the respective wind turbine generator approach the protective wind speed limit, and communicate a signal to the central controller 51. The signal typically comprises a request by the wind turbine generator to change its existing operational state. In one embodiment, the request includes a shutdown request. In a different embodiment, the request may include a request to operate the wind turbine generator at a curtailed power output. The central controller 51 is configured to sequence responses or authorizations based on the requests received from the wind turbine generators to maintain the power ramp down rate of the wind farm 12 within a maximum power ramp down rate specified by transmission system operators. This maximum specified power ramp down rate may be a function of power ramp up rates of the other power generation units 22, which generally supply power to the utility to compensate for reduced power output of the wind farm 12, for example, during such high wind speed conditions as discussed above.

Figure 2:
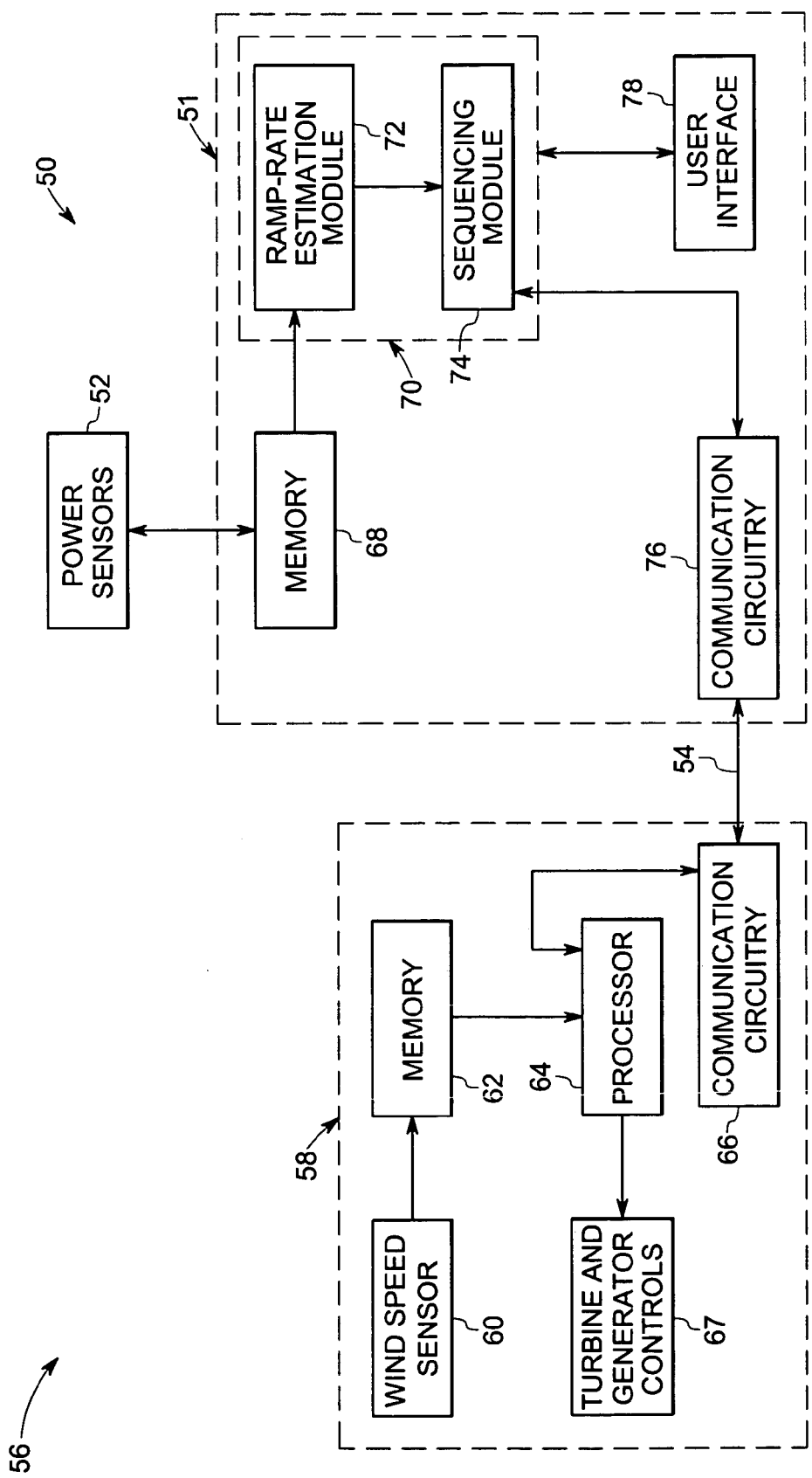
FIG. 2 is a schematic illustration of functional components of a wind farm control mechanism according to aspects of the present technique.

FIG. 2 illustrates a functional block diagram of a wind farm ramp rate control system 56 according to aspects of the present technique. The control system 56 generally comprises a turbine level control system 58, implemented at individual wind turbine generators, and a supervisory control mechanism comprising the wind farm control system 50. In the illustrated embodiment, the turbine level control system includes one or more indicators of wind speed 60, such as nacelle anemometers, which communicate measured wind speeds at the wind turbine generator sensed at different points in time, to a memory device 62 that records temporal data corresponding to the sensed wind speeds. In alternative embodiments, wind speeds may be inferred from turbine parameters such as, for example, blade pitch, turbine power, and so on. In a further embodiment, meteorological masts may used to measure wind speeds at a single location in the wind farm 12 wherefrom wind speeds at individual wind turbine generators may be determined using wind distribution data. A processor 64 is utilized to compute temporal averages of the sensed wind speeds at different points in time. In one embodiment, the temporal averages include rolling averages of sensed wind speeds for one or more moving time windows of different durations. As an example, rolling averages may be computed for moving time windows of 10 minutes, 30 seconds and 3 seconds. The processor 64 is configured to generate a signal indicative of a request to change operational state of the wind turbine generators when temporally averaged wind speeds approach the protective wind speed limit, and communicate the same to the central controller 51 via communication circuitry 66. The processor 64 is also in communication with various turbine and generator controls 67, such as pitch control system, torque or power control systems, and so forth, and is operable to alter the operational state of the wind turbine generator based on signals received from the central controller 51.

As discussed above, the wind farm control system 50 includes controller 51 and power sensors 52. The controller 51 comprises a memory 68, and a processing unit 70 including a ramp rate estimation module 72 and a sequencing module 74. The ramp rate estimation module 72 and the sequencing module 74 typically comprise machine-readable instructions implemented by a processor, such as a programmable logic controller (PLC). The memory 68 records temporal data corresponding to collective power output of the wind farm 12 sensed by the power sensors 52 at different points in time. The ramp rate estimation module 72 includes an algorithm adapted to compute temporal averages of power ramp rate of the wind farm 12 based on sensed power output of the wind farm 12. The temporal average may include, for example a rolling average of the rate of change of power output of the wind farm over a moving time window of fixed duration. In one embodiment, an instantaneous rate of change of power output may be established by computing a difference between power outputs at adjacent points in time and dividing this difference by the incremental difference in time between the adjacent points in time. Instantaneous rates of change of power may show abrupt variations in time. A rolling average is generally computed to filter out these variations and establish a uniformly varying rate of change.

The sequencing module 74 comprises an algorithm adapted to sequence the requests received from the wind turbine generators based on operating conditions of the wind turbine generators and the instantaneous rolling average of the wind farm power ramp rate computed by the ramp rate estimation module 72. Input to the sequencing module 74 may comprise operating conditions of individual wind turbine generators including wind speed, turbine speed, turbine power, rate of change of turbine speed, rate of change of turbine power, blade pitch angle, projected wind speed, and so forth communicated by respective turbine level control systems 58. The sequencing algorithm is discussed in greater detail with reference to FIG. 4. The wind farm control system 50 may further include communication circuitry 76 adapted to communicate with the wind turbine generators via communication links 54, and a user interface 78 including, for example a display of operational status of the wind turbine generators.

Figure 3:
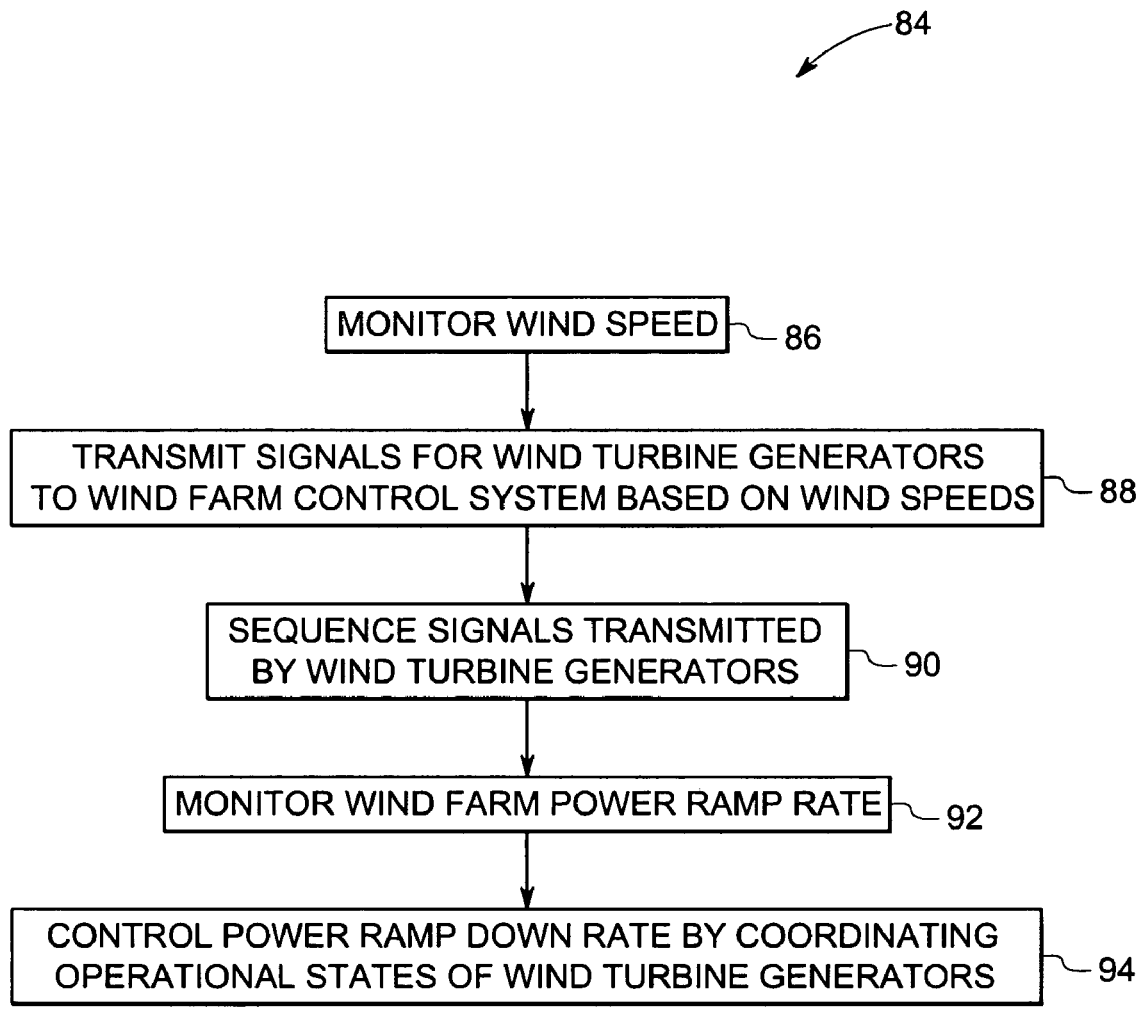
FIG. 3 is a flow chart illustrating an exemplary method of operating a wind farm according to aspects of the present technique.

FIG. 3 is a flow chart illustrating an exemplary method 84 of operating a wind farm according to aspects of the present technique. The method 84 includes monitoring wind speed at individual wind turbine generators (block 86) and transmitting signals from the wind turbine generators to the wind farm control system based on the monitored wind speeds (block 88). The signals are then sequenced by the central controller of the wind farm control system based on operating conditions of individual wind turbine generators (block 90). The method 84 further includes monitoring ramp rate of collective power output of the wind farm (block 92) and controlling the power ramp down rate of the wind farm based on a maximum specified power ramp down rate via coordinating of operational states of the wind turbine generators (block 94). Block 94 includes authorizing one or more wind turbine generators to shut down or curtail power output, while queuing up signals received from other wind turbine generators, such that power ramp down rate of the wind farm does not exceed the maximum specified power ramp down rate.

Figure 4:
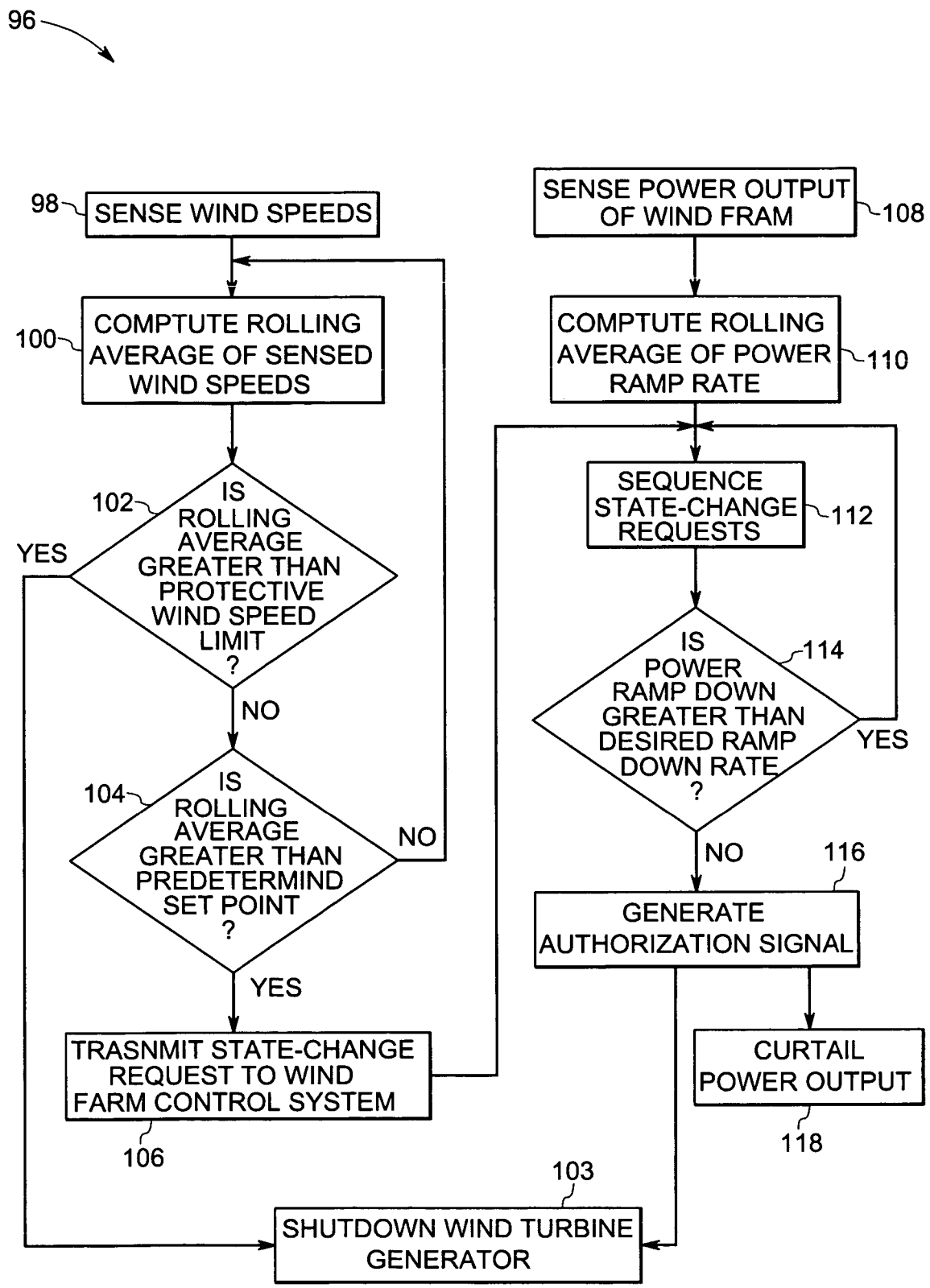
FIG. 4 is a flow chart illustrating an exemplary method for controlling rate of change of power output of a wind farm.

FIG. 4 is a flow chart illustrating an exemplary method 96 for controlling rate of change of power output of a wind farm. The method 96 includes monitoring wind speed at individual wind turbine generators by sensing wind speeds at different points in time (block 98) and computing rolling averages of the sensed wind speeds over one or more time windows (block 100). Block 100 may include computing rolling averages for time windows of 10 minutes, 30 seconds and 3 seconds duration. At block 102, the rolling averages of the wind speed for various time windows are compared to protective wind speed limit values, the protective wind speed limits being different for time windows of different durations. In an exemplary embodiment, the protective wind speed limit for the 10 minute, 30 second and 3 second windows are respectively 25 m/s, 28 m/s, 30 m/s. At block 102, if rolling averages of the wind speed for at least one time window is greater than the protective wind speed limit for that window, the protection function requires the wind turbine generator to trip or shut down (block 103) as discussed above. At block 104, the rolling averages of the wind speed for different time windows are compared to predetermined set points, which are lower than the protective wind speed limits of the respective time windows. For example, in the above embodiment, the predetermined set points for the 10 minute, 30 second and 3 second time windows may be respectively 24 m/s, 26.5 m/s and 28 m/s. If rolling averages of the wind speed for at least one time window is greater than the predetermined set point for that window, a state-change request is communicated by the wind turbine generator to the wind farm control system (block 106).

Advantageously, the predetermined set points are chosen to be lower than the protective wind speed limits to enable the wind turbine generators to anticipate a prospective high speed shutdown condition. This provides sufficient time for the wind farm control system 50 to coordinate a shutdown or a power curtailment sequence before individual wind turbine generators trip independently because of their protection function.

The method 96 further includes monitoring rate of change of power output of the wind farm by sensing collective power output of the wind farm (108) and computing a temporal average of power ramp down rate of the wind farm (block 110). Requests received from the wind turbine generators are then sequenced based on operating conditions of the wind turbine generators (block 112). At different points in time, the monitored rate of change of power output of the wind farm is compared to a maximum specified power ramp down rate (block 114). At block 116, an authorization signal to grant a request for a shut down or a curtailment of power output is generated only if, at block 114, the rate of change of power output of the wind farm is determined to be lower than the maximum specified power ramp down rate. If the maximum specified power ramp down rate is exceeded, the central controller 51 generally waits until sufficient time has elapsed such that the maximum power ramp down rate will be respected, before granting the requests by the wind turbine generators to shut down or curtail power output. If average wind speed at the wind turbine generator during this waiting period exceeds the protective wind speed limit, the protection function requires the wind turbine generator to shut down on its own even without authorization from the central controller 51

Once an authorization signal is generated, individual wind turbine generators may shut down (block 103) or curtail its power output (block 118). A shutdown operation may be carried out by either of the techniques discussed earlier, or any combinations thereof. Once shut down due to high wind speed conditions, a wind turbine generator is generally not restarted until the average wind speed at the wind turbine generator is lower than a predetermined lower set point. For example, in the above described embodiment, once shut down, the wind turbine is not restarted until a 5 minute rolling average wind speed is less than 22 m/s. In certain embodiments, the shutdown sequence may be halted for some time, and then followed by further shutdown sequences or restart sequences dependent on wind characteristics. In still further embodiments, a shutdown sequence may be initiated by the wind farm control system due to measured or forecast high winds.

Figure 5:
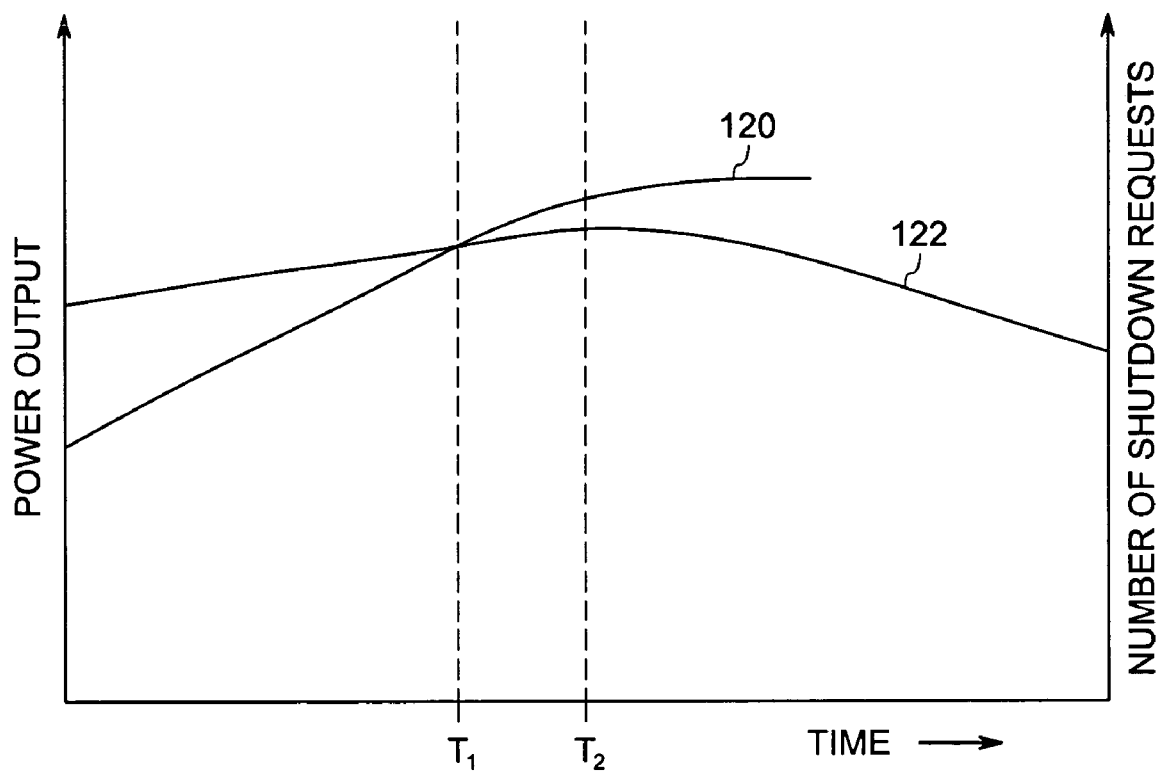
FIG. 5 is a graphical illustration showing the variation in the number of state-change requests and the power output of the wind farm with time at high wind speeds.

FIG. 5 is an exemplary graphical illustration showing the variation in the number of state-change requests and the power output of the wind farm with time at high wind speeds. Curve 120 generally represents the variation in the number of state-change requests with time and curve 122 represents the corresponding variation in the collective power output of the wind farm. As illustrated, power output of the wind farm is generally constant with increasing wind speed until time $T_1$. This is around the time when one or more of the change requests begin to be granted. Thereafter, slope of the curve 122 generally decreases, signifying a decrease in the power of the wind farm. By time $T_2$, a sufficient number of state-change requests are granted to cause the power output of the wind farm to decrease. Beyond time $T_2$, the curve 122 exhibits a negative slope, which, in accordance with the present technique is controlled not to exceed a maximum specified negative ramp rate. By proper sequencing of the of the state-change requests, power ramp down rate of the wind farm can be maintained around a desired value specified by utility requirements.

The present technique thus provides an efficient control of power ramp-down rate of a wind farm during high wind speed conditions, while maximizing energy capture during the shut down or state-change sequence. Aspects of the present technique provide a power-down sequencing and optimization algorithm that determines when an individual turbine can shutdown or curtail its power output level so that aggregate power ramp down rate objective is enforced. The present technique may also be designed to meet grid code/utility requirements for coordinated shutdown during high wind conditions.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for operating a wind farm having a plurality of wind turbine generators, the method comprising:
monitoring a parameter indicative of wind speed at the wind turbine generators;
transmitting signals representative of the monitored parameter from one or more of the plurality of wind turbine generators to a wind farm control system;
monitoring rate of change of power output of the wind farm; and
controlling the rate of change of power output of the wind farm by the wind farm control system via coordinating of operational states of the wind turbine generators based upon the signals transmitted by the one or more wind turbine generators, operating conditions of the wind turbine generators and the monitored rate of change of power output of the wind farm.

2. The method of claim 1, further comprising communicating operating conditions of the wind turbine generators to the wind farm control system.

3. The method of claim 1, wherein operating conditions of the wind turbine generators include wind speed, turbine speed, turbine power, rate of change of turbine speed, rate of change of turbine power, blade pitch angle, projected wind speed, or any combinations thereof.

4. The method of claim 1, wherein monitoring the parameter indicative of wind speed at a wind turbine generators comprises:
sensing wind speed at the wind turbine generators; and
establishing a rolling average of sensed wind speed over a predetermined time interval.

5. The method of claim 1, further comprising comparing monitored wind speeds to a protective wind speed limit and to a predetermined set point lower than the protective wind speed limit.

6. The method of claim 5, further comprising shutting down a wind turbine generator when the monitored wind speed exceeds the protective wind speed limit.

7. The method of claim 5, wherein transmitting signals from one or more of the plurality of wind turbine generators to the wind farm control system comprises transmitting a state-change request from the one or more wind turbine generators to the wind farm control system when monitored wind speed on the one or more wind turbine generators exceeds the predetermined set point lower than the protective wind speed limit.

8. The method of claim 7, wherein the state-change request comprises a shutdown request.

9. The method of claim 1, wherein monitoring the rate of change of power output of the wind farm comprises:
sensing power output of the wind farm;
determining rates of change of power output of the wind farm at different points in time; and
determining a rolling average of rates of change of power output of the wind farm determined at different points in time over a predetermined time interval.

10. The method of claim 1, wherein coordinating the operational states of the wind turbine generators comprises curtailing power output of at least one wind turbine generator.

11. The method of claim 1, wherein coordinating the operational states of the wind turbine generators comprises shutting down at least one wind turbine generator.

12. The method of claim 11, wherein coordinating operational states of the wind turbine generators comprises sequencing shutdown based on the state-change requests transmitted by the wind turbine generators.

13. The method of claim 1, wherein controlling the rate of change of power output of the wind farm is based on a desired power ramp down rate of the wind farm.

14. The method of claim 13, wherein the desired power ramp down rate of the wind farm is based on a power ramp up rate of one or more other power generation units operable to supply power conjointly with the wind farm to a utility.

15. A method for controlling rate of change of power produced by a wind farm, comprising:
  determining temporally averaged wind speeds at a plurality of wind turbine generators;
  comparing the temporally averaged wind speeds to a predetermined set point;
  transmitting a shutdown request from one or more of the plurality of wind turbine generators to a wind farm control system when the temporally averaged wind speeds on the one or more wind turbine generators exceed the predetermined set point;
  determining temporally averaged rates of change of power output of the wind farm; and
  sequencing shutdown of the one or more wind turbine generators based upon the shutdown requests by the wind farm control system, operating conditions of the wind turbine generators and the temporally averaged rates of change of power output of the wind farm.

16. A wind farm, comprising:
  a plurality of wind turbine generators operable to supply power to a utility system; and
  a wind farm control system configured to receive change of operational state requests from the wind turbine generators based on wind speed on the wind turbine generators and to coordinate operational states of the wind turbine generators based upon the change of operational state requests, operating conditions of the wind turbine generators and a desired rate of change of power output of the wind farm.

17. The wind farm of claim 16, wherein operating conditions of the wind turbine generators include wind speed, turbine speed, turbine power, rate of change of turbine speed, rate of change of turbine power, blade pitch angle, projected wind speed, or any combinations thereof.

18. The wind farm of claim 16, comprising a plurality of wind speed sensors configured to sense wind speeds on the plurality of wind turbine generators.

19. The wind farm of claim 18, wherein each of the wind turbine generators comprises a processor configured determine temporal averages of sensed wind speeds on the respective wind turbine generator over a predetermined time interval.

20. The wind farm of claim 19, wherein the processors are configured to compare temporal averages of sensed wind speeds to a predetermined set point lower than a protective wind speed limit, and to generate change of operational state requests when the temporal averages of sensed wind speeds exceed the predetermined set point.

21. A wind farm control system, comprising:
  an interface configured to receive change of operational state requests from a plurality of wind turbine generators and to transmit authorization signals for curtailment of output to the wind turbine generators based upon the requests; and
  a processing unit configured to control rate of change of power output of the wind farm by sequencing curtailment of output based on the change of operational state requests received from the plurality of wind turbine generators to coordinate curtailment of output of the wind turbine generators based on operating conditions of the wind turbine generators and monitored rate of change of power output of the wind farm.

22. At least one computer readable media, comprising:
  code adapted to receive change of operational state requests from one or more of the plurality of wind turbine generators to a wind farm control system when monitored wind speeds on the one or more wind turbine generators exceed a set point;
  code adapted to monitor rate of change of power output of the wind farm; and
  code adapted to control rate of change of power output of the wind farm via sequencing of curtailment of output in response to the requests of the wind turbine generators based upon operating conditions of the wind turbine generators and the monitored rate of change of power output of the wind farm.

* * * * *